INVENTORS
DAVID J. BLAIR
CARL D. HEROLD, JR.
BY
ATTORNEY

INVENTORS
DAVID J. BLAIR
CARL D. HEROLD, JR.
BY
*Spencer E. Olson*
ATTORNEY

United States Patent Office 3,435,344
Patented Mar. 25, 1969

3,435,344
RADIO COMMUNICATION SYSTEMS
David J. Blair, Snyder, N.Y., and Carl D. Herold, Jr.,
Sunnyvale, Calif., assignors to Sylvania Electric Products Inc., a corporation of Delaware
Filed Sept. 29, 1965, Ser. No. 491,091
Int. Cl. H04b 1/06
U.S. Cl. 325—421                               7 Claims

ABSTRACT OF THE DISCLOSURE

In a multichannel receiver a single phase-lock loop is employed to track one of the two or more received signal tones and the associated voltage controlled oscillator and multipliers are used to derive Doppler compensating local oscillator signals which are respectively applied to a mixer in each receiver channel.

---

Figure 1:
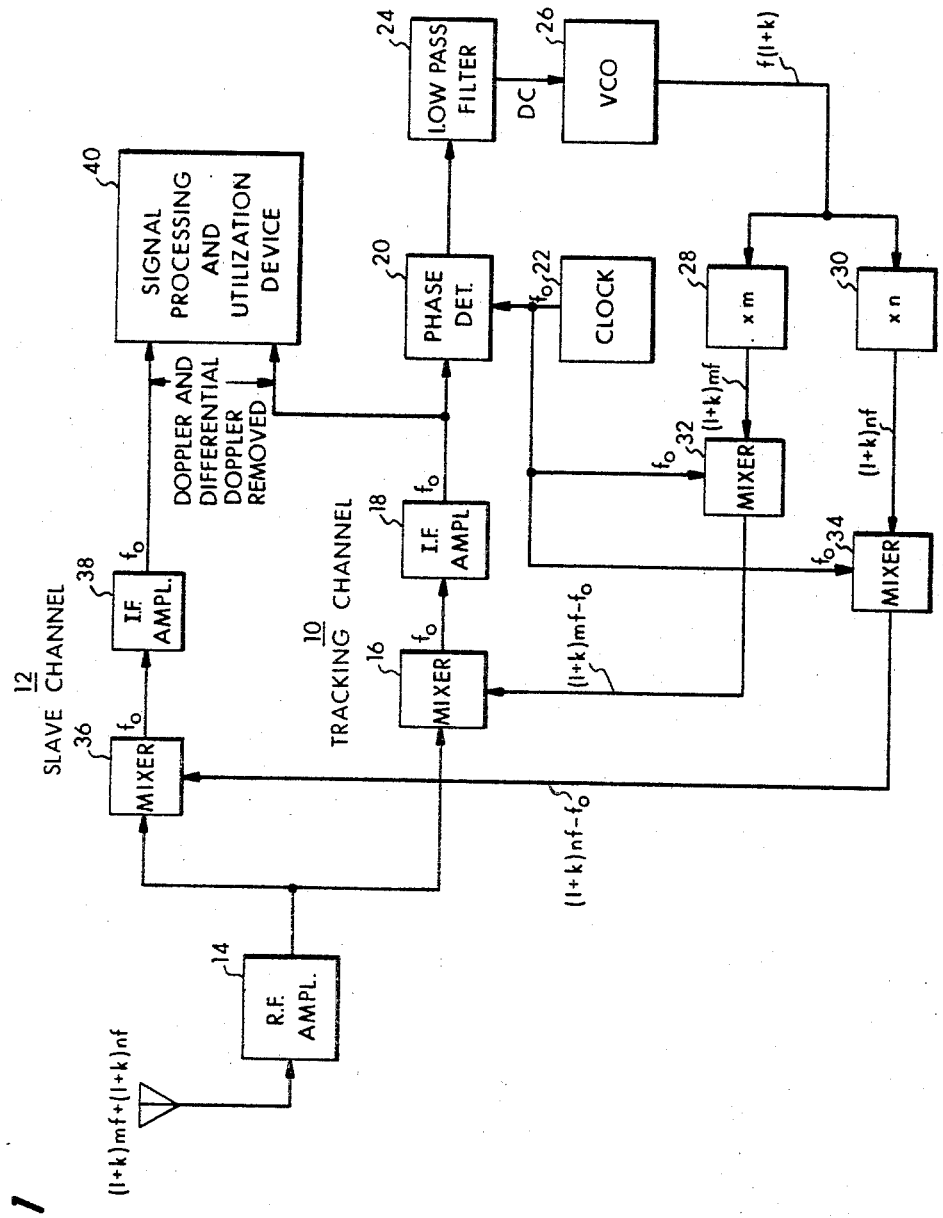

This invention relates generally to radio communication systems, and more particularly to improved means for precisely and automatically removing Doppler shift in a multichannel receiver.

In radio communication systems, relative motion between a source of radio waves and a receiver, with a consequent change in the distance therebetween, causes an apparent change in frequency of the radio wave reaching the receiver. This change in frequency is known as Doppler shift and is proportional to the relative radial velocity and the source frequency. In radio systems in which two or more coherent signal tones are transmitted, such as frequency multiplexed systems, a Doppler shift occurs in each of the received tones, and hence a Doppler shift differential exists between channels.

In a number of applications it is desirable to compensate for this Doppler shift and essentially remove it from the received signal, some applications requiring a very precise removal of the Doppler shift. For example, consider a two-tone phase measurement system for providing accurate measurement of the non-linear phase shift experienced on a communication link between two earth stations via reflection from a passive spherical satellite. The relative motion of the satellite reflector, with respect to the transmitter and receiver, translates the frequency of each of the CW tones by some amount, which is called the Doppler shift. The first order Doppler shift is that portion of the frequency change which varies linearly with the rate of change of effective path length. This Doppler shift is proportional to the sum of the two radial velocity vectors of the two ground stations with respect to the satellite. In order to convenienly measure the non-linear phase shift component of the ionosphere, the two CW tones must be converted to a common frequency in the receiver so that they can be phase compared. If this is to be done successfully, the differential Doppler shift between the two CW tones must be precisely removed.

Previous approaches for removal of Doppler shift have included making manual adjustments at the receiver, when the rate of change of the shift is small, and the use of automatic frequency control by means of a phase-lock loop. In the case of multichannel systems, a separate phase-lock loop has been used for each channel. From a circuitry and packaging point of view, such an approach for the multichannel case is obviously rather bulky, in addition to adding significantly to cost. In addition, such a multiplicity of components tends to reduce the reliability figure of the receiver. Further, for the case of the above-mentioned two-channel phase measurement system, the use of two separate phase-lock loops would certainly introduce phase instabilities of a degree sufficient to preclude accurate measurement of the non-linear phase shift.

With an appreciation of the foregoing shortcomings of available Doppler shift removal techniques, applicants have as a general object of their invention to provide improved means for removing Doppler shift in a multichannel receiver.

A more particular object of the invention is to provide a simplified means for automatically and precisely removing Doppler shift, and thereby differential Doppler shift, in a multichannel receiver.

Another object is to provide means for removing Doppler shift in a multichannel receiver which is less complex, lower in cost, and of higher reliability than previously known methods.

A further object is to provide, for multichannel receivers, a Doppler shift elimination technique having improved phase stability.

Briefly, these and related objects are achieved in a multichannel receiver by employing a single phase-lock loop to track one of the two or more received signal tones and using the associated voltage controlled oscillator and multipliers to derive Doppler compensating local oscillator signals which are respectively applied to a mixer in each receiver channel. A preferred embodiment of the invention, particularly useful when handling microwave signals and applicable when the relative phase and frequency relationships of the transmitted signals are known, derives the Doppler compensating local oscillator signals by means of a unique phase stable circuit combination comprising a high order multiplier, a low order variable frequency multiplier, a balanced modulator and tunable filters for selecting the frequency to be applied to each mixer.

Figure 2:
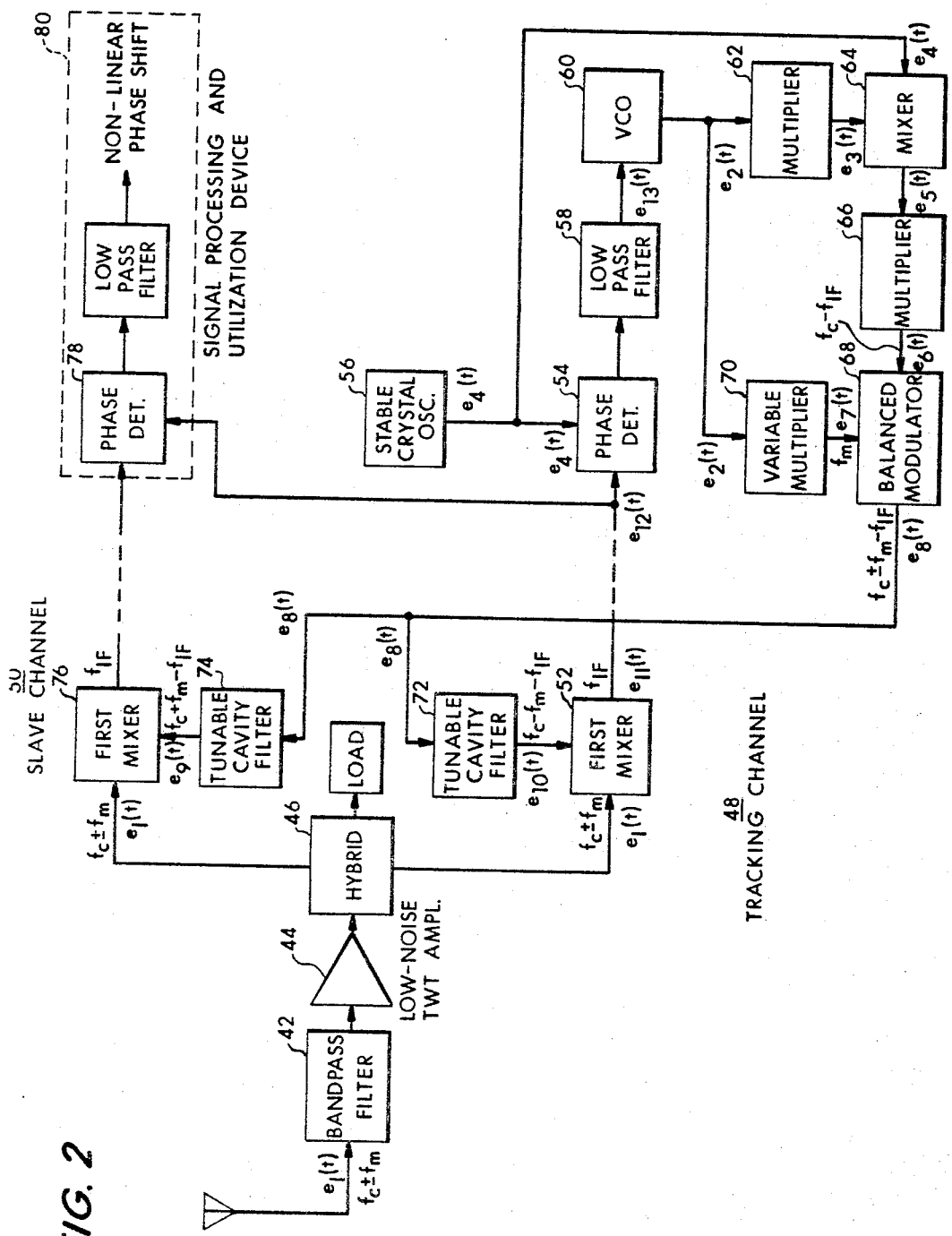

Other objects, features and advantages of the invention, and a better understanding of its organization and operation, will become apparent from the following description, reference being had to the accompanying drawings, in which:

FIG. 1 is a general block diagram of a two-channel receiver including means for removing Doppler shift in accordance with the present invention; and, FIG. 2 is a simplified block diagram of a two-channel receiver including a preferred embodiment of the present invention.

Referring to FIG. 1, a simplified diagram of a two-channel receiver in accordance with the present invention is shown in which the incoming signal, in simplified terms, may be expressed as:

$$(1+k)mf+(1+k)nf$$

where, $(1+k)$ is a factor due to Doppler shift of the transmitted tones, and $m$ and $n$ are factors such that $mf$ is the frequency of one transmitted tone and $nf$ is the frequency of the other tone, where $m \neq n$, and $m/n$ is a rational number. The frequencies $(1+k)mf$ and $(1+k)nf$ are assumed to be within the passband of the receiver.

As mentioned above, it is well known that Doppler shift may be removed from a single receiver channel by employing a phase-lock loop in that channel. A feature of the present invention is the recognition that if the receiver phase locks to frequency $(1+k)mf$ to remove Doppler shift from one channel, the frequency $(1+k)f$ can thereby be derived, and by multiplying $(1+k)f$ by $n$ to obtain $(1+k)nf$, a local signal is provided for removing Doppler shift from the second channel.

The receiver of FIG. 1, therefore, comprises, in general, a tracking channel 10 and a slave channel 12 to which the incoming signal is applied in parallel from the output of RF amplifier 14. In the tracking channel, the incoming signal is applied to a mixer 16 along with a local replica of $(1+k)mf$ displaced in frequency by the intermediate frequency $f_o$, this local mixing signal being derived from the tracking channel phase-lock loop as will be described below. The intermediate frequency (IF) output of mixer 16 is applied through an IF amplifier 18 to a phase detector 20 where it is phase compared with the output $f_0$ of a clock source 22. A slowly varying frequency and phase difference produces an output signal from the phase detector which is a function of the difference between the two inputs to mixer 16. The output of the phase detector is then passed through a low pass filter 24 to provide a DC signal for correcting the phase and frequency of a voltage controlled oscillator 26. Oscillator 26 is controlled to provide a $(l+k)f$ output signal in parallel to a $xm$ multiplier 28 and a $xn$ multiplier 30. The $(l+k)mf$ output of multiplier 28 is applied to a mixer 32 where it is mixed with the $f_0$ signal from the clock source 22 to produce the Doppler compensated local oscillator signal $(l+k)mf-f_0$ for the tracking channel. The $(l+k)nf$ signal from multiplier 30 is mixed with the clock signal $f_0$ in mixer circuit 34 to provide the Doppler compensated local oscillator signal $(l+k)nf-f_0$ for slave channel 12. It is readily seen, therefore, that if there are $x$ more transmitted signals and $x$ additional receiver channels, the $x$ respective Doppler compensated local oscillator signals may be derived merely by connecting in parallel from the output of voltage controlled oscillator 26 a serially connected multiplier and mixer for each of the $x$ additional slave channels.

In slave channel 12, the incoming signal is mixed with the local signal $(l+k)nf-f_0$ in a mixer 36 to provide an IF signal $f_0$ which is applied to IF amplifier 38. The $f_0$ outputs of IF amplifiers 18 and 38, now free of Doppler shift and consequently also free of differential Doppler shift, are applied to respective inputs of a signal processing and utilization device 40 for phase comparison, signal recording, or demodulation, etc.

The circuit embodiment of FIG. 1, however, may pose serious design problems, especially where an extremely high order of multiplication is required, as, for example, in the case of microwave local oscillator signals. The major problem would be in attempting to achieve phase stability in two large multipliers over a wide range of operating conditions. Further, the multipliers comprising each local oscillator source would have to have identical phase characteristics across the frequency band of operation. A receiver implementation employing two large multipliers, as described, would remove Doppler shift when phase-locked, but due to a significant frequency/phase drift that would certainly exist in the local oscillator signal, the Doppler removal would be relatively inexact.

A preferred embodiment of the present invention which has been demonstrated to provide very precise removal of Doppler shift, even when handling microwave signals, will now be discussed in somewhat greater detail as related to a specific application—the aforementioned two-tone phase measurement system. In this system the two CW signals that are to be phase compared are transmitted such that their relative phase and frequency relationships are known. Referring to FIG. 2, in which is shown a simplified block diagram of a two-channel microwave receiver including this preferred embodiment, the input to the receiver is a Doppler and phase shifted version of the transmitted signal, which in this case is a double sideband suppressed carrier (DSSC) signal. The upper and lower sideband CW signals are filtered and amplified in a bandpass filter 42 and broadband low-noise TWT amplifier 44, then divided in a hybrid 46 and applied equally to a first mixer in each of the parallel receiver channels, a tracking channel 48 and a slave channel 50. In the first mixer 52 of the tracking channel, the lower sideband signal is mixed with a phase-smoothed replica of itself, displaced in frequency by the intermediate frequency (IF). The smoothed replica is developed by a phase-lock loop similar to that previously described except that it uses only one high order multiplier, a relatively low order variable frequency multiplier, a balanced modulator and tunable cavity filters.

The output of mixer 52, which may be translated down to a desired final IF output signal, is applied to a phase detector 54 where it is phase compared with the output of a stable crystal oscillator 56, which functions as a clock source. A slowly varying frequency and phase difference produces an output signal from the phase detector which is a function of the difference between the phases of the two inputs to the first mixer. The output of the phase detector is then passed through a low-pass (tracking) filter 58 and applied to the control element of a voltage-controlled oscillator (VCO) 60.

The VCO output is split into two signal paths; one path proceeds through a frequency multiplier 62, a side-step mixer 64 where the multiplied VCO output is mixed with the stable crystal oscillator output, and a high order frequency multiplier 66 to provide a fixed microwave carrier input to a balanced modulator 68; the other VCO output path proceeds through a relatively low order variable multiplier or frequency synthesizer 70 to provide a modulating signal of relatively low frequency to the balanced modulator. The double sideband output from the balanced modulator is applied in parallel to a pair of tunable cavity filters 72, 74. Filter 72 selects the lower sideband signal from the balanced modulator for application as the local oscillator signal for the first mixer in the tracking channel, thereby closing the phase-lock loop which acquires and tracks, both in frequency and phase, the receiver lower sideband signal. The tunable cavity filter 74 selects the upper sideband signal from the balanced modulator to provide a Doppler compensated local oscillator signal for the first mixer 76 in the slave channel; hence, the receiver upper sideband signal is mixed with a phase smoothed replica of itself displaced by the IF.

The above described local oscillator generating scheme employs a single fixed microwave source (comprising multiplies 62 and 66 and mixer 64), in which phase stability can be achieved, and a relatively low frequency variable multiplier or synthesizer for which small phase instabilities would be reduced to a negligible level in the balanced modulator output. As a consequence, the resulting local oscillator signal has negligible frequency/phase drift, thereby enabling Doppler shift to be removed very precisely.

The output signal from the first mixer 76 of the slave channel, which may be translated down to a desired final IF output signal, is supplied to a phase detector 78 where it is phase compared with the final IF output signal from the tracking channel. The filtered output of the phase detector 78 is an indication of the differential non-linear phase shift caused by the propagation medium between the upper and lower sideband CW signals. Phase detector 78 and the circuitry and equipment that follows it may be considered a signal processing and utilization device 80.

A mathematical analysis of the signal processing in the receiver of the FIG. 2 phase measurement system will now be presented. For purposes of illustration, the following frequency and multiplier values will be assumed: Circuits 62 and 66 are $\times 10$ and $\times 44$ multipliers, respectively; variable multiplier 70 is $\times 2N$, where $N=1, 3, 5, 7$, and the transmitter and receiver clock frequencies are each 5 mc./sec. Consequently, the suppressed carrier frequency of the transmitted signal, $f_c$, is 2.2 gc./sec.; the IF output of the first mixer, $f_{IF}$, is 220 mc./sec.; and, the choice of modulating frequencies, $f_m$, is 10, 30, 50 or 70 mc./sec.

The Doppler shifted incoming double sideband suppressed carrier signal is:

$$e_1(t) = A'_1 \cos [(1+k)(440+2N)\omega_T t + (440+2N)\theta_T]$$
$$+ A''_1 \cos [(1+k)(440-2N)\omega_T t + (440-2N)\theta T]$$

where: the A terms represent peak signal amplitudes; $\omega_T = 2\pi f_T$ where $f_T = 5$ mc./sec., the frequency of the transmitter clock; $(l+k)$ is, as before, the factor due to Doppler shift of the transmitted signals; and $\theta_T$ is the phase angle, relative to some reference, of a stable crystal oscillator in the transmitter. The expression includes the contributions due to the $\times 440$ and $\times 2N$ frequency multipliers (whose sum and difference are the two sidebands), and, the single- and double-prime terms refer to upper and lower sidebands, respectively.

For purposes of simplification, the phase uncertainty term assigned to each block and non-linear phase shift introduced by the propagation medium have been assumed equal to zero for the above expression and those to follow. Hence, the above expression also represents the input to the first mixer in each parallel receiver channel.

Consider now the synthesis of the local oscillator signal for the first mixer. Let the output of the voltage controlled oscillator 60 be:

$$e_2(t) = A_2 \cos (\omega_v t + \theta_v)$$

where $\omega_v = 2\pi f_v$, $f_v$ = frequency of the voltage controlled oscillator, and $\omega_v$ is the VCO phase angle relative to some reference. Then the output of the $\times 10$ frequency multiplier 62 is:

$$e_3(t) = A_3 \cos (10\omega_v t + 10\theta_v)$$

This signal, $e_3(t)$, is mixed with $e_4(t)$, the output of the stable crystal oscillator 56:

$$e_4(t) = A_4 \cos (\omega_r t + \theta_r)$$

where $\omega_r = 2\pi f_r$, $f_r = 5$ mc./sec. and $\theta_r$ is the oscillator 56 phase angle relative to some reference.

The difference frequency is selected at the mixer 64 output:

$$e_5(t) = A_5 \cos [(10\omega_v - \omega_r)t + (10\theta_v - \theta_r)]$$

The signal $e_5(t)$ is then frequency multiplied by 44 (by multiplier 66). The multiplied output is:

$$e_6(t) = A_6 \cos [(440\omega_v - 44\omega_r)t + (440\theta_v - 44\theta_r)]$$

and serves as the microwave carrier input to balanced modulator 68 where it is mixed with the modulating signal $e_7(t)$ which is the output of the $\times 2N$ multiplier 70:

$$e_7(t) = A_7 \cos (2N\omega_v t + 2N\theta_v)$$

The output (first upper and first lower sidebands only) of the balanced modulator is:

$$e_8(t) = A'_8 \cos [(440+2N)\omega_v t + (440+2N)\theta_v - 44\omega_r t - 44\theta_r]$$
$$+ A''_8 \cos [(440-2N)\omega_v t + (440-2N)\theta_v - 44\omega_r t - 44\theta_r]$$

where, as before, the single-prime and double-prime terms refer to upper and lower sidebands, respectively.

The output of the upper turnable cavity filter 76, which selects the first upper sideband, is:

$$e_9(t) = A_9 \cos [(440+2N)\omega_v t + (440+2N)\theta_v - 44\omega_r t - 44\theta_r]$$

and the output of the lower tunable cavity 72, which selects the first lower sideband, is:

$$e_{10}(t) = A_{10} \cos [(440-2N)\omega_v t + (440-2N)\theta_v - 44\omega_r t - 44\theta_r]$$

Consider now the output of the first mixer 52 in the tracking channel, where $e_1(t)$ and $e_{10}(t)$ are mixed and the difference frequency between their respective lower sidebands selected is:

$$e_{11}(t) = A_{11} \cos [44\omega_r t + 44\theta_r + (l+k)(440-2N)\omega_T t - (440-2N)\omega_v t + (440-2N)(\theta_T - \theta_v)]$$

By following the first mixer with two or more serially connected mixers and using local oscillator signal sources derived from clock oscillator 56 (not shown in FIG. 2), $e_{11}(t)$ is translated down to the following final intermediate frequency output signal (5 mc./sec.):

$$e_{12}(t) = A_{12} \cos [\omega_r t + \theta_r + (l+k)(440-2N)\omega_T t - (440-2N)\omega_v t + (440-2N)(\theta_T - \theta_v)]$$

This final IF output is compared with the stable oscillator 56 output $$e_4(t) = A_4 \cos (\omega_r t + \theta_r)$$

in phase detector 54. The expression for the phase detector output after the lower pass filter is:

$$e_{13}(t) = A_{13} \cos [(l+k)(440-2N)\omega_T t - (440-2N)\omega_v t + (440-2N)(\theta_T - \theta_v)]$$

Under phase-locked conditions in a phase-lock loop, it is known that a static phase angle difference will exist between the inputs to a phase detector, but no frequency difference will exist if phase-lock is maintained. Therefore, from the last equation:

$$(l+k)(440-2N)\omega_T t - (440-2N)\omega_v t = 0$$

or $$(l+k)\omega_T = \omega_v$$

which is $2\pi$ times the frequency of the VCO, and appropriate substitution for $\omega_v$ can be made in all preceding equations in which it appears, thereby resulting in the precise elimination of the factor $(l+k)$ due to the Doppler shift in the tracking channel. Since the output, $e_8(t)$ of the balanced modulator is also applied through tunable cavity 74 to the first mixer in the slave channel, appropriate substitution for $\omega_v$ in the equation for the output of this mixer will result in the precise elimination of the (1+k) Doppler factor in the slave channel also.

A broadband microwave, S-band, receiver embodying the concepts described in FIG. 2 has been implemented for the simultaneous reception and automatic Dopplercorrection of two signals widely separated in frequency. This receiver has demonstrated a capability of phase locking to and tracking a pair of $-122$ d.b.m. CW signals. After phase locking to one of the incoming signals, the VCO of the tracking channel is used as the source of the other channel local oscillator. This method automatically corrects for Doppler and thereby compensates for differential Doppler shift between the two received signals. The complete elimination of simulated Doppler (60 kc. at 2 kc./s.[2] rates) has been demonstrated. The use of a single phase-lock loop in this manner provides the advantages of less complexity, lower cost, and higher reliability over a receiver using multiple loops.

This S-band receiver can be used for active or passive satellites or scatter communications, high sensitivity being achieved by use of the phase-locked loop. Although Doppler information derived in the phase-locked loop is described as being used to correct Doppler shift in only one slave channel, it should be understood that the derived Doppler information could just as well be used to correct Doppler shifts in multiple channels. In FIG. 2, for example, this may be accomplished by having tunable cavity filters associated with the additional slave channels select sidebands other than the first upper and lower sidebands of the modulator 68 output to provide local oscillator signals for the additional channels. By properly phase compensating and coherently combining the outputs of multiple channels, a broadband signal could be received. Sensitivity of such a broadband receiver would be equivalent to the single narrowband, phase-locked receiver.

While a preferred embodiment of the invention has been described, it will be understood that it is not limited to the particular features and system illustrated. As has been mentioned, the invention is applicable to systems using frequencies other than those discussed and using two or more receiver channels. The multiplier circuits are not limited to the values discussed, and multiplier 62 or multiplier 66 may be omitted depending upon requirements of the system and design feasibility. If a single modulating frequency is used in the transmitter, multiplier 70, of course need not be variable. Also fixed filters of a type suitable for the frequency of operation may be employed, and other type modulators may be used for circuit 68. It is

What is claimed is:

1. In a multichannel radio receiver, means for removing Doppler shift from first and second incoming signal tones comprising, a phase-lock loop associated with a first channel of said receiver for tracking said first tone, means for deriving from said phase-lock loop a fundamental signal the frequency of which is a common factor of the frequencies of said first and second incoming signal tones, means including a frequency multiplier and a mixer for translating said fundamental signal frequency up to the frequency of said second incoming signal tone displaced by a selected intermediate frequency to thereby provide a Doppler compensated local oscillator signal for a second channel of said receiver, and means for mixing said local oscillator signal with said second incoming signal tone in said second channel.

2. In a multichannel radio receiver, each channel of which comprises a first mixer followed by serially connected circuit means for providing a final intermediate frequency output signal for application to a respective input of a signal processing and utilization device, means for removing Doppler shift from first and second incoming signal tones, comprising, a clock source, a phase detector for phase comparing the final intermediate frequency output signal from a first channel of said receiver with the signal from said clock source and providing an output signal in response thereto, a voltage controlled oscillator having a control element and an output terminal, a filter connected between the output of said phase detector and the control element of said oscillator, a first circuit path including a frequency multiplier and a mixer serially connected between the output terminal of said oscillator and an input of the first mixer in said first receiver channel for translating the frequency of the output signal from said oscillator up to the frequency of said first incoming signal tone displaced by a selected intermediate frequency to thereby provide a Doppler compensated local oscillator signal for said first receiver channel, a second circuit path including a frequency multiplier and a mixer serially connected between the output terminal of said oscillator and an input of the first mixer in a second channel of said receiver for translating the frequency of the output signal from said oscillator up to the frequency of said second incoming signal tone displaced by a selected intermediate frequency to thereby provide a Doppler compensated local oscillator signal for said second receiver channel, and means connecting the output of said clock source in parallel to an input of the first mixer in each of said first and second circuit means.

3. In a multichannel radio receiver, each channel of which comprises a first mixer followed by serially connected circuit means for providing a final intermediate frequency output signal for application to a respective input of a signal processing and utilization device, means for removing Doppler shift from first and second incoming signal tones comprising, a clock source, a phase detector for phase comparing the final intermediate frequency output signal from a first channel of said receiver with the signal from said clock source and providing an output signal in response thereto, a voltage controlled oscillator having a control element and an output terminal, a filter connected between the output of said phase detector and the control element of said oscillator, a modulator, a first circuit path including a mixer and a frequency multiplier serially connected between the output terminal of said oscillator and a first input of said modulator for applying a carrier signal to said modulator, means connecting the output of said clock source to an input of the mixer in said first circuit path, a second circuit path including a frequency multiplier connected between the output terminal of said oscillator and a second input of said modulator for applying a modulating signal to said modulator, said first and second circuit paths and said modulator being operative in combination to provide a modulated output signal which includes first and second sideband frequencies equal to the frequencies of said first and second incoming signal tones, respectively, each displaced by a selected intermediate frequency, a first filter connected between the output of said modulator and an input of the first mixer in said first receiver channel for selecting said first sideband frequency for application as a Doppler compensated local oscillator signal for said first receiver channel, and a second filter connected between the output of said modulator and an input of the first mixer in a second channel of said receiver for selecting said second sideband frequency for application as a Doppler compensated local oscillator signal for said second receiver channel.

4. A receiver in accordance with claim 3 wherein said modulator is a balanced modulator and the order of the frequency multiplier in said first circuit path is relatively high with respect to the order of the frequency multiplier in said second circuit path.

5. A receiver in accordance with claim 4 wherein said frequency multiplier in said second circuit path is variable.

6. A receiver in accordance with claim 5 wherein said carrier signal is a microwave signal and said filters are tunable cavity filters.

7. A receiver in accordance with claim 3 wherein said first and second incoming signal tones comprise a double sideband suppressed carrier signal, said modulator is a balanced modulator, said first circuit path comprises a first frequency multiplier, a mixer and a second frequency multiplier serially connected in that order between the output terminal of said oscillator and a first input of said balanced modulator for applying a microwave carrier signal to said modulator, said second circuit path comprises a variable frequency multiplier connected between the output terminal of said oscillator and a second input of said balanced modulator for applying a modulating signal to said modulator of relatively low frequency with respect to said carrier signal, the output from said modulator is a double sideband signal, and said filters are tunable cavity filters.

No references cited.

KATHLEEN H. CLAFFY, *Primary Examiner.*

R. S. BELL, *Assistant Examiner.*

U.S. Cl. X.R.

325—346, 363